United States Patent
Wood et al.

(10) Patent No.: US 7,533,153 B1
(45) Date of Patent: May 12, 2009

(54) METHOD FOR MANAGING INSTANT MESSAGING PRESENCE BY GROUP

(75) Inventors: Douglas Andrew Wood, Raleigh, NC (US); Kamorudeen Larry Yusuf, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/121,522

(22) Filed: May 15, 2008

(51) Int. Cl.
 *G06F 15/16* (2006.01)
 *G06F 15/173* (2006.01)
 *G06F 15/18* (2006.01)

(52) U.S. Cl. .................. 709/206; 709/207; 709/225; 726/27

(58) Field of Classification Search .............. 709/206
 See application file for complete search history.

(56) References Cited

U.S. PATENT DOCUMENTS

| | | | |
|---|---|---|---|
| 2004/0158609 A1* | 8/2004 | Daniell et al. | 709/206 |
| 2004/0158610 A1* | 8/2004 | Davis et al. | 709/206 |
| 2004/0158611 A1* | 8/2004 | Daniell et al. | 709/206 |
| 2005/0216565 A1* | 9/2005 | Ito et al. | 709/206 |
| 2005/0223075 A1* | 10/2005 | Swearingen et al. | 709/207 |
| 2006/0015609 A1* | 1/2006 | Hagale et al. | 709/224 |
| 2006/0248184 A1 | 11/2006 | Wu et al. | |
| 2007/0011230 A1* | 1/2007 | Clech et al. | 709/204 |
| 2007/0061405 A1* | 3/2007 | Keohane et al. | 709/207 |
| 2007/0282657 A1 | 12/2007 | Hupfer et al. | |
| 2007/0288573 A1 | 12/2007 | Malik | |
| 2007/0299927 A1 | 12/2007 | Knauerhase | |
| 2008/0075066 A1 | 3/2008 | Baker | |
| 2008/0086531 A1* | 4/2008 | Chavda et al. | 709/206 |
| 2008/0159515 A1* | 7/2008 | Rines | 379/221.08 |
| 2008/0195620 A1* | 8/2008 | Abanami et al. | 707/9 |

OTHER PUBLICATIONS

James Fogarty et al., Evaluation of a context-Aware Communication Client, http://www.cs.washington.edu/homes/jfogarty/publications/ijhcs2004.pdf, date unknown.

* cited by examiner

*Primary Examiner*—Jeffrey C. Pwu
*Assistant Examiner*—Guang Li
(74) *Attorney, Agent, or Firm*—Weitzman Law Offices, LLC; Kenneth S. Weitzman

(57) ABSTRACT

A computer implemented method for managing IM presence based on task context, comprising storing group affiliations for a requesting IM user and a target IM user. A request from the requesting IM user is received for the target IM user's status. The requesting IM user's group affiliation is determined. The target IM user's status relationship associated with the requesting IM user's group affiliation is determined. The status relationship for the target IM user is returned to the requesting IM user. Communication from the requesting IM user is forwarded to a predefined reroute destination if the target IM user has defined the reroute destination for communication originating from the requesting IM user's group affiliation.

1 Claim, 3 Drawing Sheets

METHOD FOR MANAGING INSTANT MESSAGING PRESENCE BY GROUP

BACKGROUND

1. Field of the Invention

This disclosure relates generally to instant messaging systems and, more particularly, to a method for filtering an instant messaging user's groups based on the particular task currently occupying the instant messaging user.

2. Description of Related Art

The Internet has revolutionized the way people communicate. E-mail was adopted rapidly as the main form of Internet communication. More recently, Instant Messaging ("IM") has become an increasingly popular way to communicate over the Internet. Unlike E-mail, IM allows people to interact over the Internet in real-time by exchanging typed text messages on graphical user interfaces ("GUI").

Current IM GUIs allow IM users to manage a static list of people with whom they interact, and the GUIs also indicate the status of each person on an IM user's list. A person on an IM user's list may be in active status, inactive status, or away status. Active status usually indicates that the person's IM presence is logged on ready to receive messages. Inactive status usually indicates that the person's IM presence is logged off and unable to receive messages. Away status usually indicates that a person's IM presence is logged on, but they are currently away from the computer.

IM is also being used in professional settings allowing colleagues to collaborate on tasks during the day. When an IM user works on a particular task, the IM user needs to interact with people assigned to the same task without interruptions from other people on the IM user's list. Currently, IM GUIs give an IM user the ability to appear inactive to everyone on their list even though their IM presence is actually logged on. IM GUIs also give an IM user the ability to select particular people to whom they want to appear inactive. An IM user working on a particular task will want to appear active only to the people assigned to the same task while appearing inactive to others. With the features currently available on IM GUIs, the IM user would be required to scan his list to determine who is currently assigned to the task. Furthermore, some people assigned to the task may not exist on an IM user's contact list. Therefore, it is desirable to have the ability to appear active only to people working on the same task by selecting a group of people instead of selecting each individual person.

BRIEF SUMMARY

In one aspect of this disclosure, a computer implemented method for managing IM presence based on task context, comprising storing group affiliations for a requesting IM user and a target IM user. A request from the requesting IM user is made for the target IM user's status. The requesting IM user's group affiliation is determined. The target IM user's status relationship associated with the requesting IM user's group affiliation is determined. The status relationship for the target IM user is returned to the requesting IM user. Communication from the requesting IM user is forwarded to a predefined reroute destination if the target IM user has defined the reroute destination for communication originating from the requesting IM user's group affiliation.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWING

This disclosure is further described in the detailed description that follows, with reference to the drawing, in which.

DETAILED DESCRIPTION

The present application discloses a system and method for managing groups on an IM interface that allows an IM user to appear visible only to people assigned to a particular group. Each group is preferably be associated with a particular task context, and every one assigned to that task preferably automatically subscribes to that group by using known collaboration tool software (e.g., Rational's Jazz project). Once an IM user subscribes to a particular group, everyone else subscribed to that group may appear on the IM user's contact list, even if they were not on the list before. While an IM user is subscribed to a particular task context group, that IM user preferably appears inactive to anyone not subscribed to the group. It is understood that the disclosed system and method is not limited to task context groups, but may also include other activity such as conference calls. A conference call group would allow users to appear visible only to participants of the conference call and appear inactive to everyone else.

Figure 1:
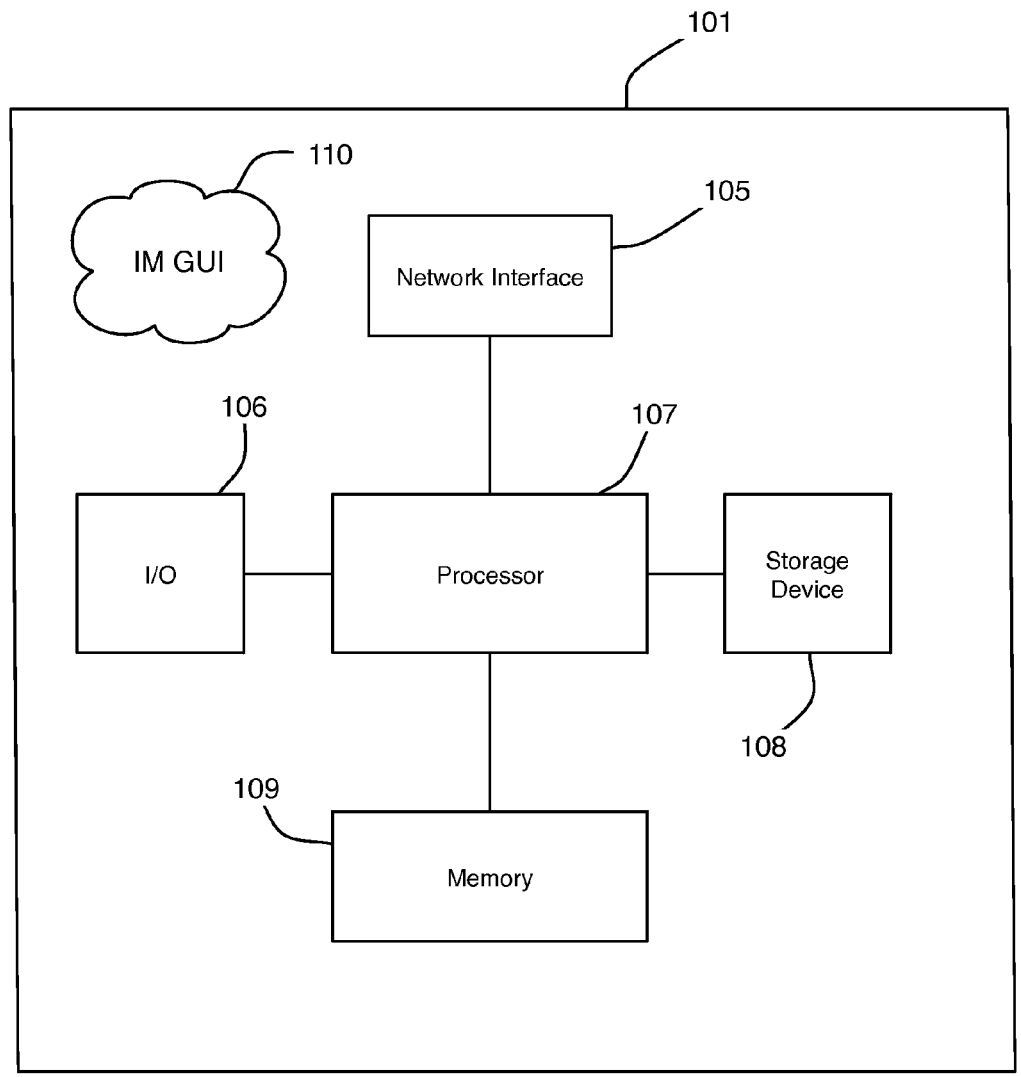
FIG. 1 is a high level diagram of an exemplary computer.

The disclosed method may be implemented as a series of programming instructions embedded in an IM interface 110 of FIG. 1, executing on a computer 101. Such computers executing programs are well known in the art and may be implemented, for example, using a well-known computer processor, memory units, storage devices, computer software, and other components.

Exemplary computer 101 preferably contains a processor 107 that controls the overall operation of computer 101 by executing computer program instructions defining such operation. The computer program instructions embedded in IM interface 110 may be stored in a storage device 108 (e.g., magnetic disk) or any other computer-readable medium, and loaded into memory 109 when execution of the computer program instructions is desired. Thus, in one embodiment, the disclosed method may comprise computer program instructions 110 stored in memory 109 and/or storage device 108, and executed by processor 107. Computer 101 may also include one or more network interfaces 105 for communicating with other nodes in the cluster. Computer 101 may also include input/output devices 106, which represent devices allowing for user interaction with computer 101 (e.g., display, keyboard, mouse, speakers, buttons, etc.). One skilled in the art will recognize that an implementation of an actual computer may contain additional components and that FIG. 1 is a high level representation of some of the components of such a computer for illustrative purposes.

Figure 2:
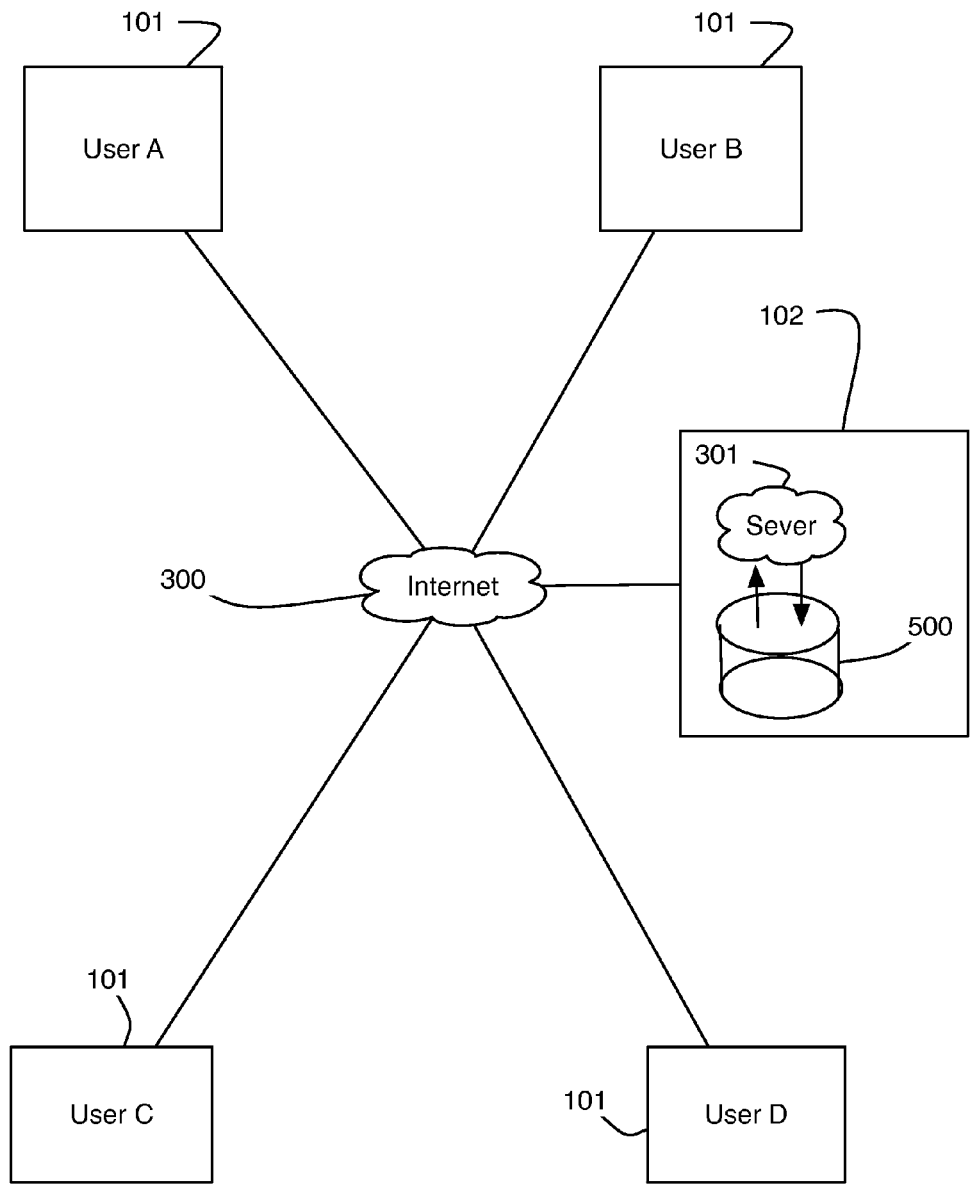
FIG. 2 is an exemplary instant messaging network.

FIG. 2 illustrates an exemplary IM network with four computers similar in architecture to computer 101 of FIG. 1 having Users A, B, C and D. In addition, FIG. 2 includes a computer 102, similar in architecture to computer 101, with server software 301 replacing IM GUI 110 and database software 500 that may contain each users' state information, contact lists and group information.

Database 500 may contain database tables that organize each user by task context groups. The database 500 may be maintained dynamically as groups are created. Database 500 may interface with known collaboration software such as "Rational Jazz" so that groups can remain current.

The following is a working example to better understand the method disclosed in the current application. Assume that User B and User D of FIG. 2 are in a task context group called "SUPPORT GROUP." Database 500 may have a table called "GROUPS" having the following structure:

| User | Group |
|---|---|
| B | Support Group |
| D | Support Group |

Database 500 may also have a table called "GROUP STATE" that maps each user's state to each group. An exemplary GROUP STATE table is provided below:

| User | Group | State |
|---|---|---|
| A | Support Group | Active |

The above table setting may allow User B and D to communicate with User A. The GROUP STATE table may join with the GROUPS table to determine who belongs to, for example, "SUPPORT GROUP." If, for example, User A sets his status to "busy" or "inactive" for "SUPPORT GROUP," computer 101 for User A preferably sends a request to server software 301 to update the GROUP STATE table on database 500 using known database commands, which may result in amending the GROUP STATE table to the following example:

| User | Group | State |
|---|---|---|
| A | Support Group | Busy |

If User B queries server 301 with his IM GUI for the state of User A, the server software 301 may query the GROUP STATE table and the GROUPS table to determine User B's group and User A's state relationship with "SUPPORT GROUP." The server software 301 may respond to User B's computer and User A preferably appears as "busy" or "inactive" on User B's IM GUI. Furthermore, User B is preferably unable to communicate with User A until User A changes his state relationship with SUPPORT GROUP.

Database 500 may also contain a reroute table that allows the server to determine where to reroute communication while a user is busy. The reroute table may look like the following:

| User | Group | Destination |
|---|---|---|
| A | Support Group | Admin Group |

The exemplary table above named "REROUTE" states that all communications from SUPPORT GROUP should be rerouted to the ADMIN GROUP whenever User A's status relationship with SUPPORT GROUP is "busy." Alternatively, the reroute destination may be, for example, a file on storage medium 108 of User A's computer.

Database 500 may also contain a table called OVERRIDE structured as the following:

| User | Group | Override User |
|---|---|---|
| A | Support Group | B |

The exemplary OVERRIDE table may be used to allow a user from a blocked group to continue to communicate with the user. For example, the above OVERRIDE table entry states that User A gave an override to User B whenever User A's relationship with Support Group is "busy." Thus, although User A set his relationship with SUPORT GROUP as "busy," User B is may still view and communicate with User A.

It is understood that the foregoing database tables are exemplary and that they are not limited to the foregoing structure and/or examples. One of ordinary skill in the art would understand that database tables may be arranged in a variety of ways to achieve the same result.

Figure 3:
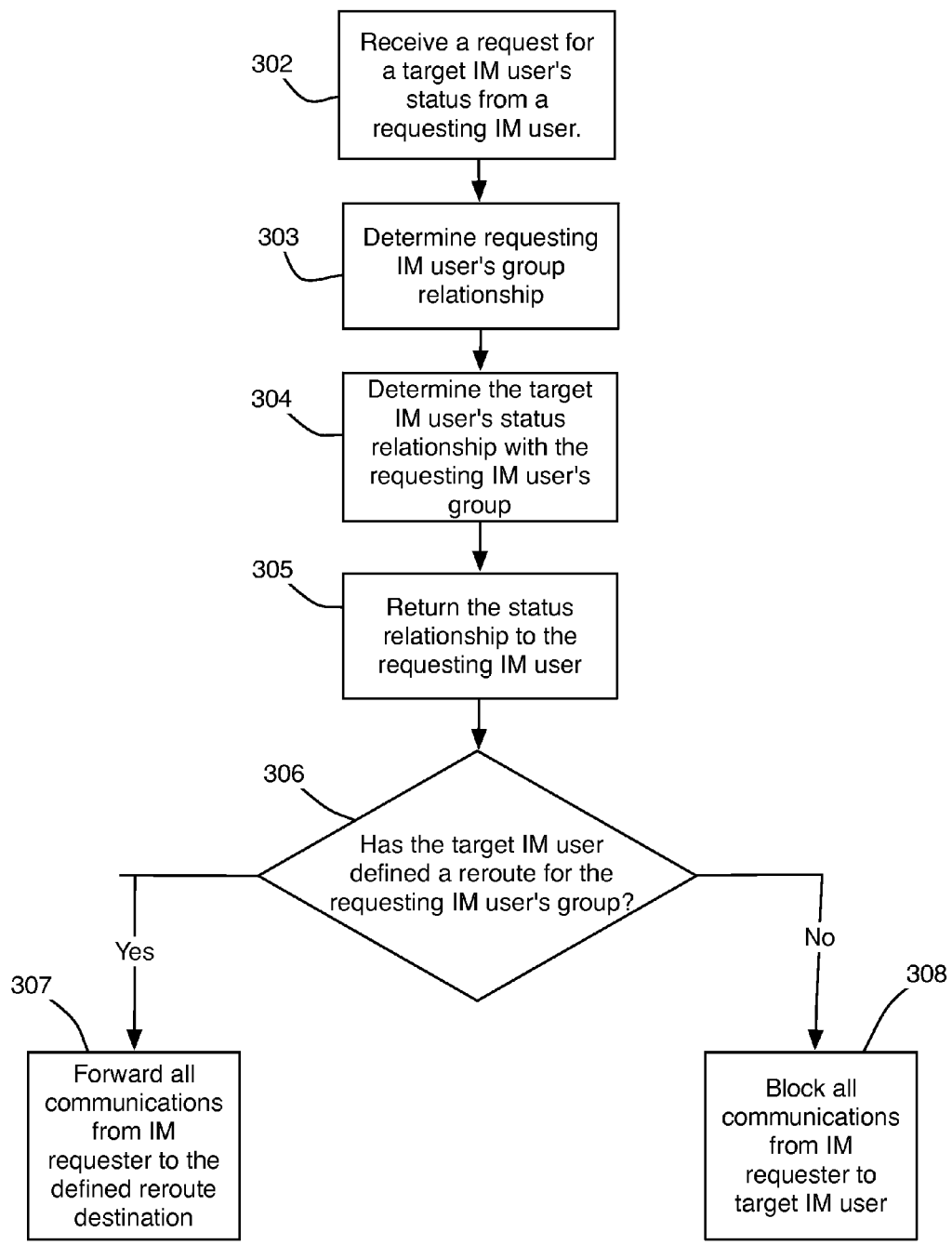
FIG. 3 is a preferred series of steps for managing IM presence based on groups.

FIG. 3 illustrates a preferred series of steps for rerouting messages from one user to another user (the "requesting IM user" to the "target IM user"), whenever the server software 301 receives a request for communication from, for example, the requesting IM user's IM GUI 110. The target IM user may, for example, be listed in the requesting user's contact list.

In step 302, the request is received by the server software 301 for the status of the target IM user. In step 303, the server software 301 determines the requesting IM user's group affiliation by, for example, querying the Groups Table stored in database 500. In step 304, the server software 301 determines the status relationship between the target IM user and the requesting IM user's group affiliation by, for example, querying the Groups Table stored in database 500. In step 305, the server software 301 preferably returns the status relationship of the target IM user to the IM GUI 110 of the requesting IM user. In step 306, the server software determines whether the target IM user has predefined a reroute destination for communications originating from the requesting IM user's group affiliation. If the target IM user has predefined a reroute destination for communication originating from the requesting IM user's group affiliation, then, in step 307, the server software 301 preferably forwards communication from the requesting IM user to the predefined reroute destination. If not, then the server software 301 blocks communication from the requesting IM user to the target IM user in step 308.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A computer implemented method for managing IM presence based on task context, comprising:

storing group affiliations and override exceptions for a requesting IM user and a target IM user;

receiving a request from the requesting IM user for the target IM user's status;

determining the requesting IM user's group affiliation;

determining the target IM user's status relationship associated with the requesting IM user's group affiliation;

returning the status relationship for the target IM user to the requesting IM user; and forwarding communication from the requesting IM user to a predefined reroute destination if the target IM user has defined the reroute destination for communication originating from the requesting IM user's group affiliation;

determining whether the target IM user has granted the requesting IM user an override exception if the target IM user's status relationship indicates that the requesting IM user is affiliated with a group that the target IM user does not currently wish to communicate with; and forwarding communication from the requesting IM user to the target IM user if it is determined that the target IM user has granted the requesting IM user an override exception.

\* \* \* \* \*